United States Patent
Nakayama et al.

(10) Patent No.: US 12,151,760 B2
(45) Date of Patent: Nov. 26, 2024

(54) FRONT COWL

(71) Applicant: SUZUKI MOTOR CORPORATION, Hamamatsu (JP)

(72) Inventors: Yoshihisa Nakayama, Hamamatsu (JP); Yuki Mochizuki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 602 days.

(21) Appl. No.: 17/462,429

(22) Filed: Aug. 31, 2021

(65) Prior Publication Data

US 2022/0073166 A1 Mar. 10, 2022

(30) Foreign Application Priority Data

Sep. 7, 2020 (JP) .................................. 2020-149715

(51) Int. Cl.
*B62J 17/10* (2020.01)
*B62D 35/00* (2006.01)
*B62D 35/02* (2006.01)

(52) U.S. Cl.
CPC ............ *B62J 17/10* (2020.02); *B62D 35/005* (2013.01); *B62D 35/02* (2013.01)

(58) Field of Classification Search
CPC ........... B60J 17/02; B60J 17/10; B62D 35/00; B62D 35/005; B62D 35/008; B62D 35/02
USPC ............................................. 296/78.1, 180.1
See application file for complete search history.

(56) References Cited

U.S. PATENT DOCUMENTS 6,276,482 B1   8/2001 Moriya et al.

FOREIGN PATENT DOCUMENTS

| CN | 101164826 B | * | 8/2010 | .............. B62J 17/02 |
|---|---|---|---|---|
| EP | 2543581 A1 | | 1/2013 | |
| JP | H11-171071 A | | 6/1999 | |
| JP | 2000-025672 A | | 1/2000 | |
| JP | 2006-062553 A | | 3/2006 | |
| JP | 2008-087544 A | | 4/2008 | |
| JP | 2012-153299 A | | 8/2012 | |
| JP | 2013-018306 A | | 1/2013 | |
| JP | 2013-071552 A | | 4/2013 | |

OTHER PUBLICATIONS

Text CN10116826 (Year: 2010).*
Office Action issued on Jan. 23, 2024 in Japanese Patent Application No. 2020-149715 (with English translation).
Extended European Search Report issued in EP 21194013.5 on Jan. 24, 2022.

* cited by examiner

*Primary Examiner* — Dennis H Pedder
(74) *Attorney, Agent, or Firm* — TROUTMAN PEPPER HAMILTON SANDERS LLP

(57) ABSTRACT

A front cowl for covering a vehicle front portion of a straddle-type vehicle is provided. The front cowl includes a discontinuous portion which has a non-streamlined shape with respect to a flow of traveling wind and is formed on a lower surface of the front cowl. In the front cowl, a position of a lower edge of the discontinuous portion may be lower than a position of a front fork bracket provided at a vehicle front portion of the straddle-type vehicle.

12 Claims, 9 Drawing Sheets

FRONT COWL

CROSS-REFERENCE TO RELATED APPLICATIONS

The disclosure of Japanese Patent Application No. 2020-149715 filed on Sep. 7, 2020, the contents of which is incorporated herein by reference in its entirety.

BACKGROUND

The present invention relates to a front cowl.

A straddle-type vehicle such as a motorcycle is provided with a front cowl covering a front portion of the vehicle (see, for example, JP-A-2000-025672). The front cowl described in JP-A-2000-025672 is formed in a streamlined shape such that traveling wind flows from a vehicle front side to a vehicle rear side during traveling of the straddle-type vehicle, air resistance due to the traveling wind is reduced, and an occupant is protected from the traveling wind. A front fender covering a front wheel is provided below the front cowl, and the traveling wind enters between the front cowl and the front fender. The traveling wind cools an engine by flowing toward the engine.

SUMMARY

According to one advantageous aspect of the present invention, there is provided a front cowl for covering a vehicle front portion of a straddle-type vehicle, including a discontinuous portion which has a non-streamlined shape with respect to a flow of traveling wind and is formed on a lower surface of the front cowl.

DETAILED DESCRIPTION

When the traveling wind enters between the front cowl and the front fender, the traveling wind is guided to the vehicle rear side along a lower surface of the front cowl. If there is a portion on an extension line of the lower surface of the front cowl where it is hard to discharge wind, air resistance received from the traveling wind increases. Further, the traveling wind directed to the engine located behind the front wheel is reduced, and a heat dissipation performance is reduced.

The present invention has been made in view of the above circumstances, and an object thereof is to provide a front cowl capable of improving a heat dissipation performance of an engine while reducing air resistance due to traveling wind.

A front cowl according to an aspect of the present invention covers a vehicle front portion of a straddle-type vehicle. A discontinuous portion which has a non-streamlined shape with respect to a flow of traveling wind is formed on a lower surface of the front cowl, and the flow of the traveling wind along the lower surface of the front cowl is separated by the discontinuous portion. Since the traveling wind is not guided by the lower surface of the front cowl, air resistance received from the traveling wind is reduced even if there is a portion on an extension line of the lower surface of the front cowl where it is hard to discharge wind. Since the traveling wind easily flows below the lower surface of the front cowl from a vehicle front side toward a vehicle rear side, the traveling wind is effectively blown toward an engine, and a heat dissipation performance is improved.

Figure 1:
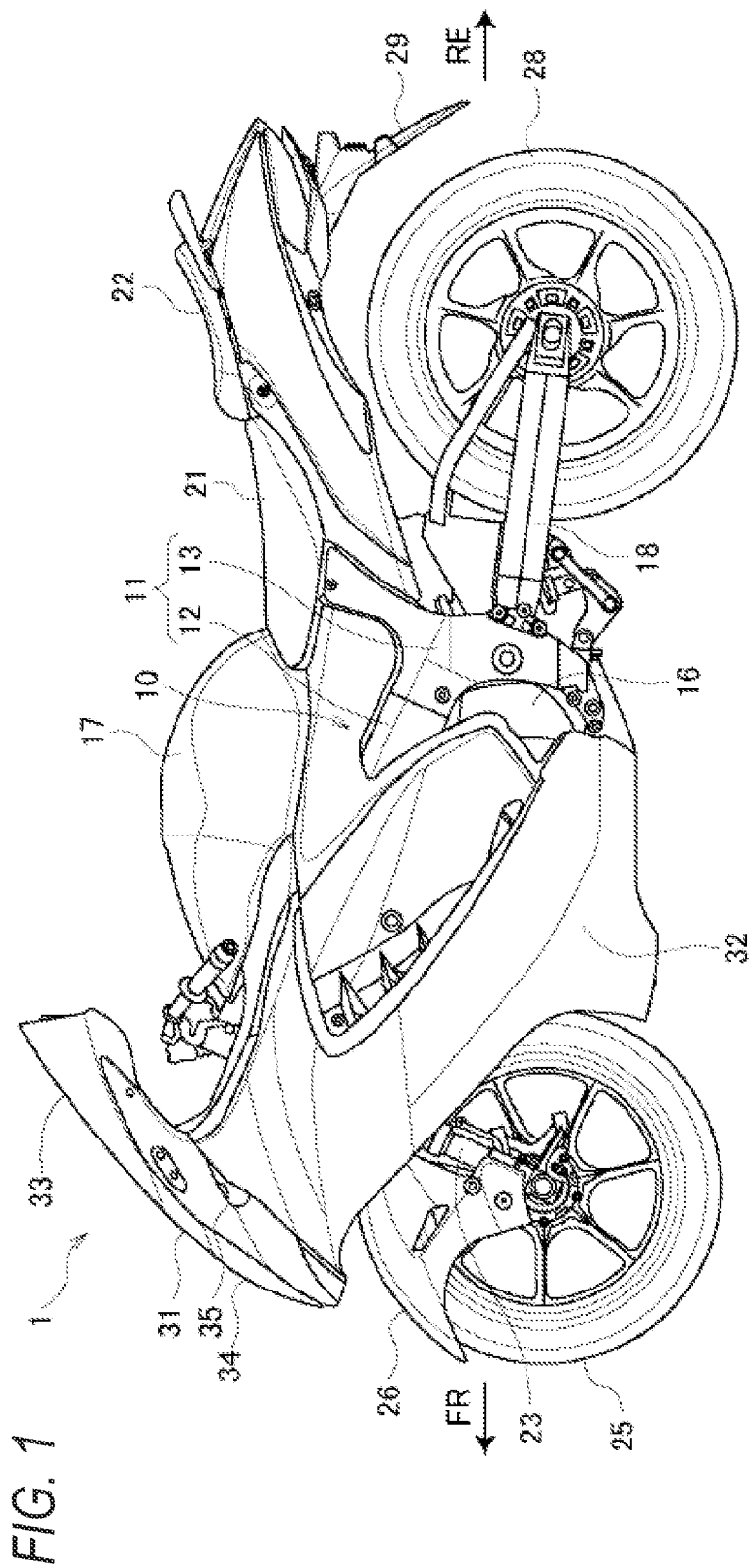
FIG. 1 is a left side view of a straddle-type vehicle according to a present embodiment of the present invention.

Hereinafter, the present embodiment will be described in detail with reference to the accompanying drawings. FIG. 1 is a left side view of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 is configured by mounting various components such as an engine 16 and an electrical system on a twin spar-type vehicle body frame 10 formed by aluminum casting. The vehicle body frame 10 includes a pair of main frames 11 branching from a head pipe (not illustrated) to left and right and extending rearward, and a pair of down frames (not illustrated) branching from the head pipe to the left and right and extending downward. A rear portion of the engine 16 is supported by the pair of main frames 11, and a front portion of the engine 16 is supported by the pair of down frames. By supporting the engine 16 with the vehicle body frame 10, the rigidity of the entire vehicle is ensured.

Front portions of the pair of main frames 11 serve as tank rails 12 located above the engine 16, and a fuel tank 17 is supported by the tank rails 12. Rear portions of the pair of main frames 11 serve as body frames 13 located behind the engine 16, and swing arms 18 are swingably supported in substantially intermediate positions in an upper-lower direction of the body frames 13. Seat rails (not illustrated) and a back stay (not illustrated) extend rearward from upper portions of the body frames 13. A rider seat 21 and a pillion seat 22 are supported on the seat rails behind the fuel tank 17.

A pair of front forks 23 are supported on the head pipe via a steering shaft (not illustrated) so as to be steered. A front wheel 25 is rotatably supported by lower portions of the front forks 23, and an upper portion of the front wheel 25 is covered with a front fender 26. The swing arms 18 extend rearward from the body frames 13. A rear wheel 28 is rotatably supported at rear ends of the swing arms 18, and an upper side of the rear wheel 28 is covered with a rear fender 29. The engine 16 is coupled to the rear wheel 28 via a chain drive-type transmission mechanism, and power from the engine 16 is transmitted to the rear wheel 28 via the transmission mechanism.

Some covers are attached to the vehicle body frame 10 of the straddle-type vehicle 1 as a vehicle body exterior. For example, a front surface side of the vehicle front portion is covered with a front cowl 31, and side surface sides of the vehicle front portion are covered with a pair of side cowls 32. A screen 33 is provided on an upper portion of the front cowl 31, and a headlamp 34 and a pair of turn signal lamps 35 are exposed from a front surface of the front cowl 31. The front cowl 31, the screen 33, the headlamp 34, the pair of turn signal lamps 35, and the pair of side cowls 32 form a streamlined shape that reduces air resistance received from traveling wind.

Figure 2:
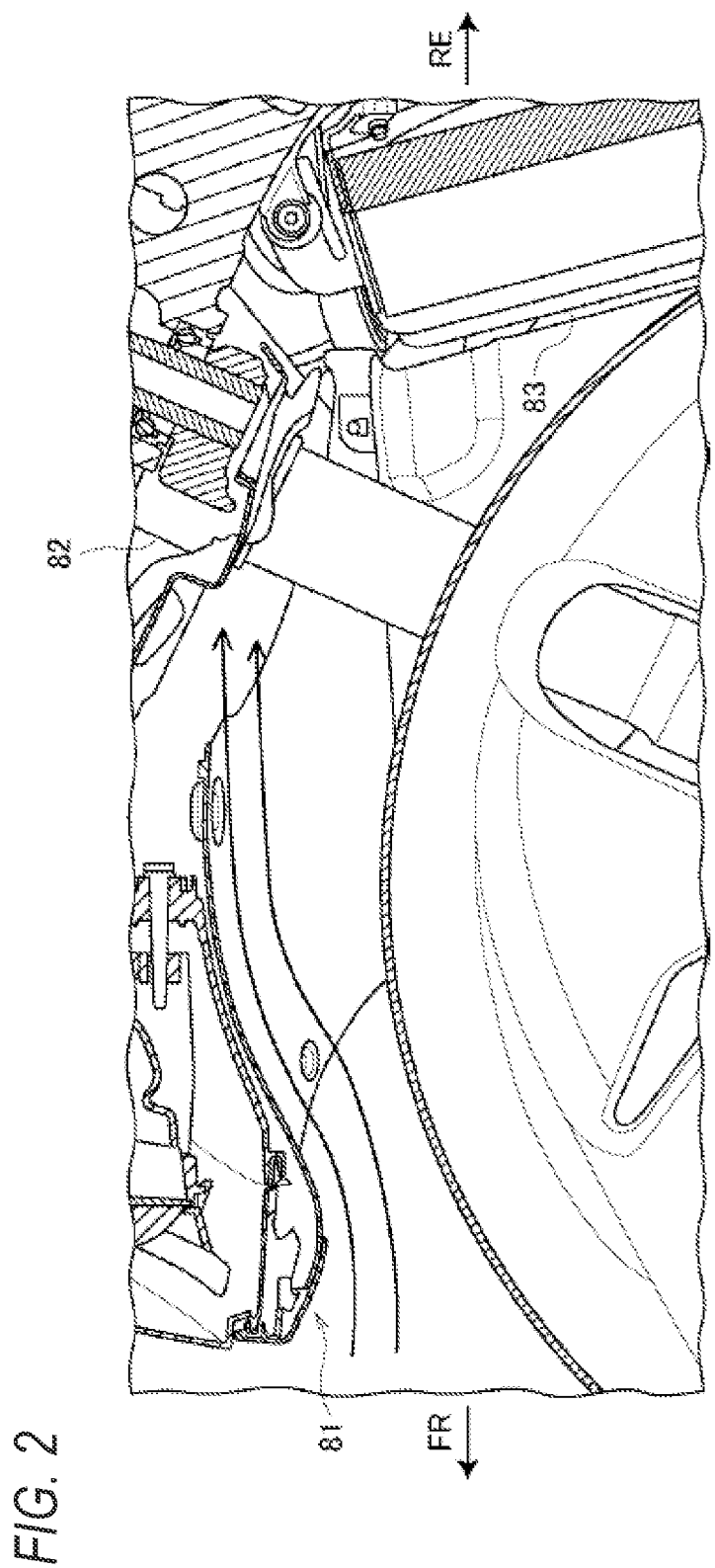
FIG. 2 is a view illustrating a flow of traveling wind below a front cowl according to a comparative example.

A lower surface of a front cowl 81 illustrated in a comparative example of FIG. 2 is formed in a continuous curved shape from the vehicle front side to the vehicle rear side, and a front fork bracket 82 is positioned on an extension line of the lower surface of the front cowl 81. During traveling of the vehicle, traveling wind flows along the lower surface of the front cowl 81 and is blown toward the front fork bracket 82, and the traveling wind further flows into gaps between various components such as a fuel tank and an air cleaner where it is hard to discharge wind, and the air resistance increases. Further, a part of the traveling wind is blown toward the driver through the gaps between the components, and comfort during the traveling of the vehicle is impaired.

Further, since the traveling wind flows along the lower surface of the front cowl 81, the amount of the traveling wind directed to the engine 16, that is, the amount of the traveling wind directed to a radiator 83 below the front fork bracket 82 and a cylinder behind the radiator 83 is reduced, and a heat dissipation performance is reduced. In this way, since the lower surface of the front cowl 81 is formed by a continuous surface having a streamlined shape with respect to the flow of the traveling wind, the traveling wind flows from a front end to a rear end of the lower surface of the front cowl 81 without being separated, thereby causing an increase in the air resistance, deterioration in the comfort, and a decrease in the heat dissipation performance. Therefore, a part of a lower surface of the front cowl 31 of the present embodiment is formed by a discontinuous surface so as to have a non-streamlined shape with respect to the flow of the traveling wind.

Figure 3:
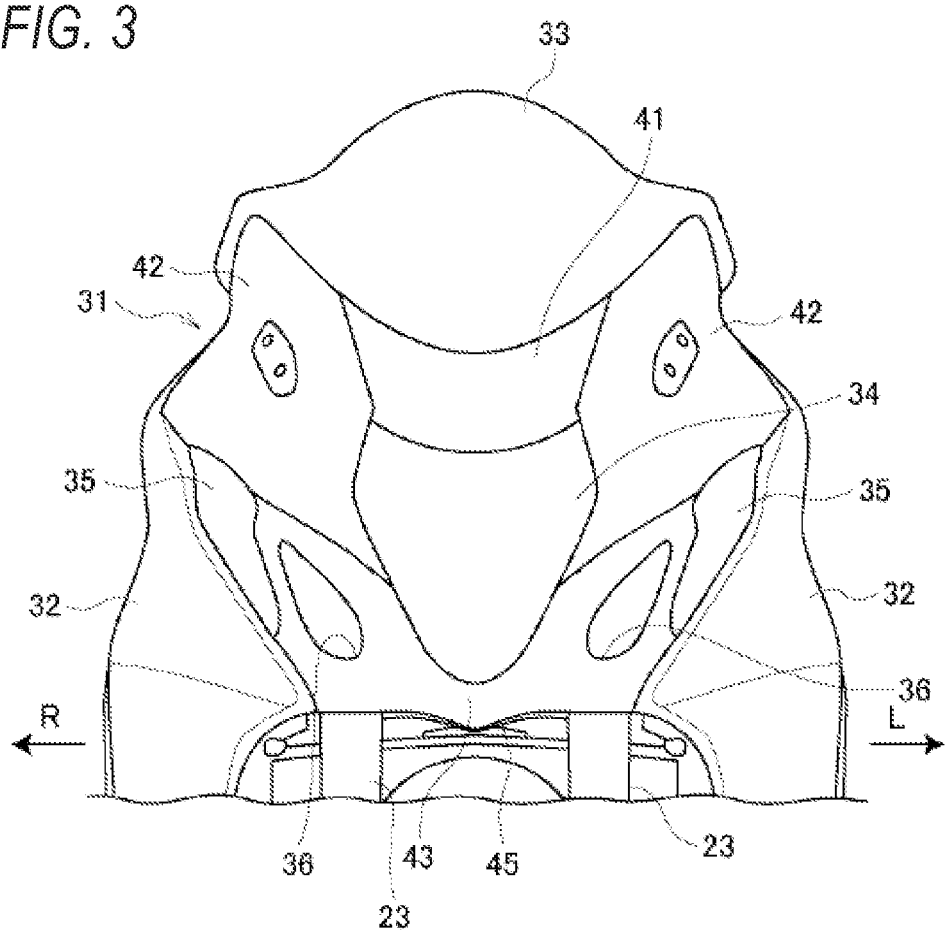
FIG. 3 is a front view of a vehicle front portion according to the present embodiment.
Figure 4:
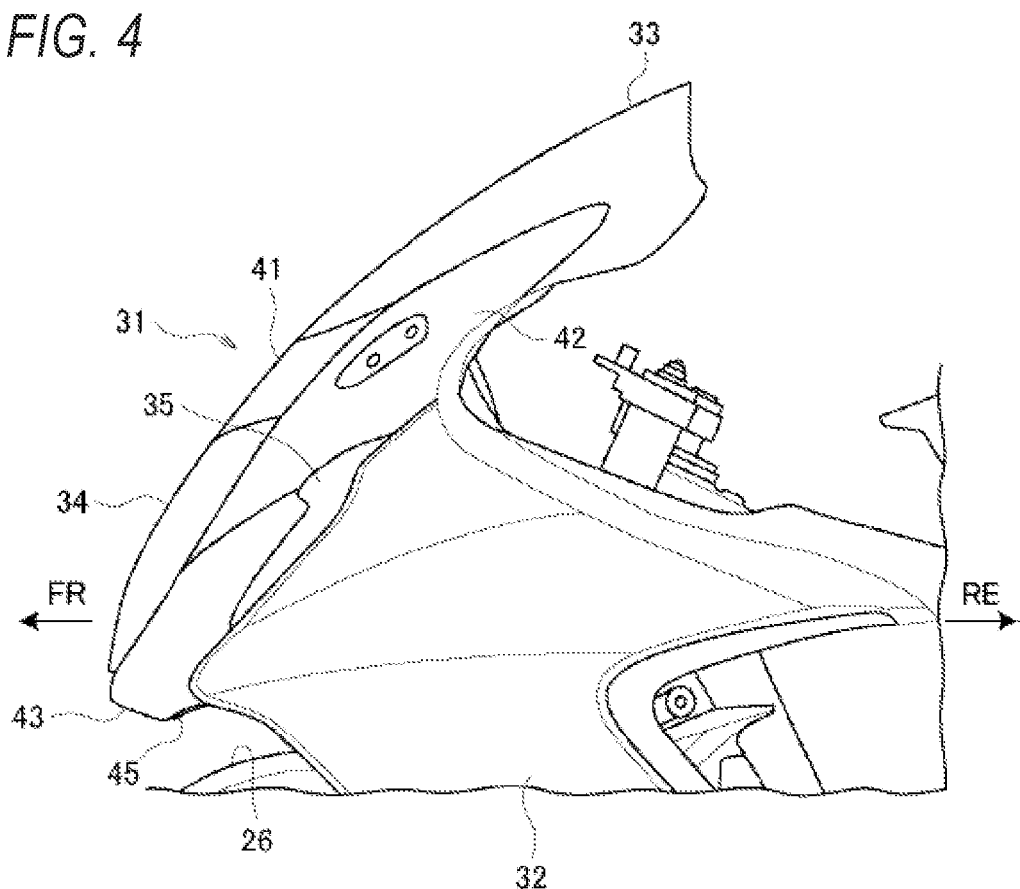
FIG. 4 is a side view of the vehicle front portion according to the present embodiment.
Figure 5:
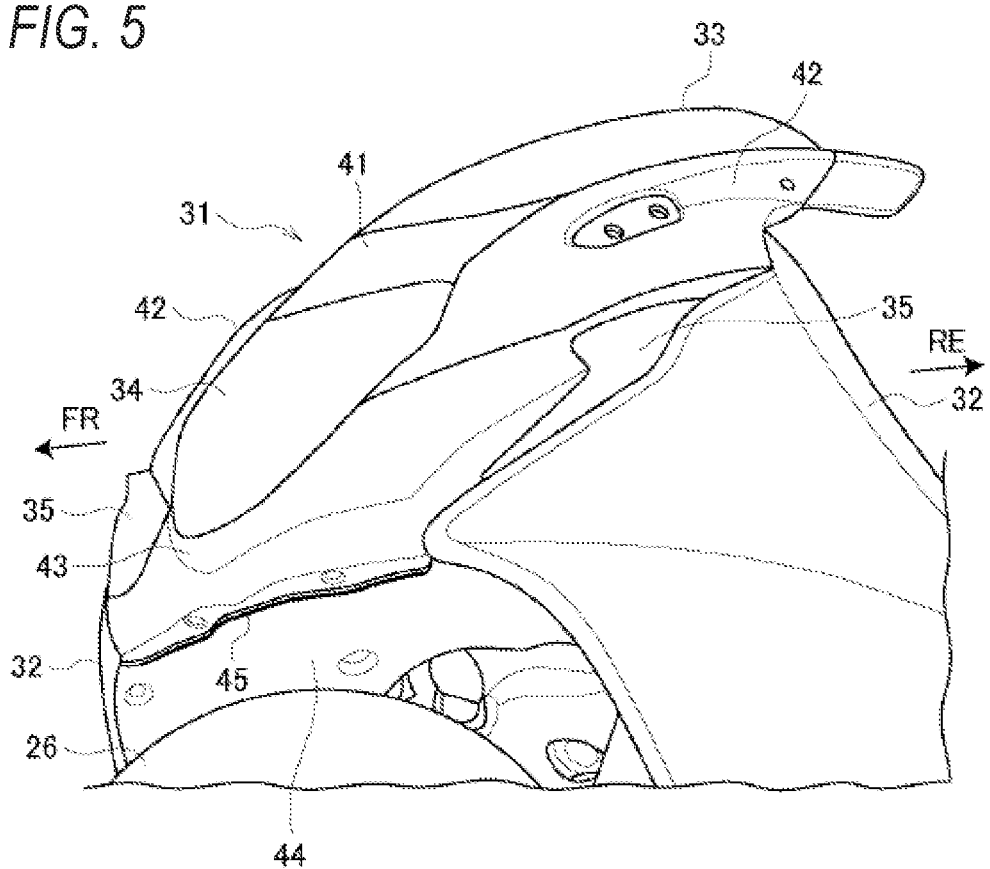
FIG. 5 is a perspective view of the vehicle front portion according to the present embodiment.
Figure 6:
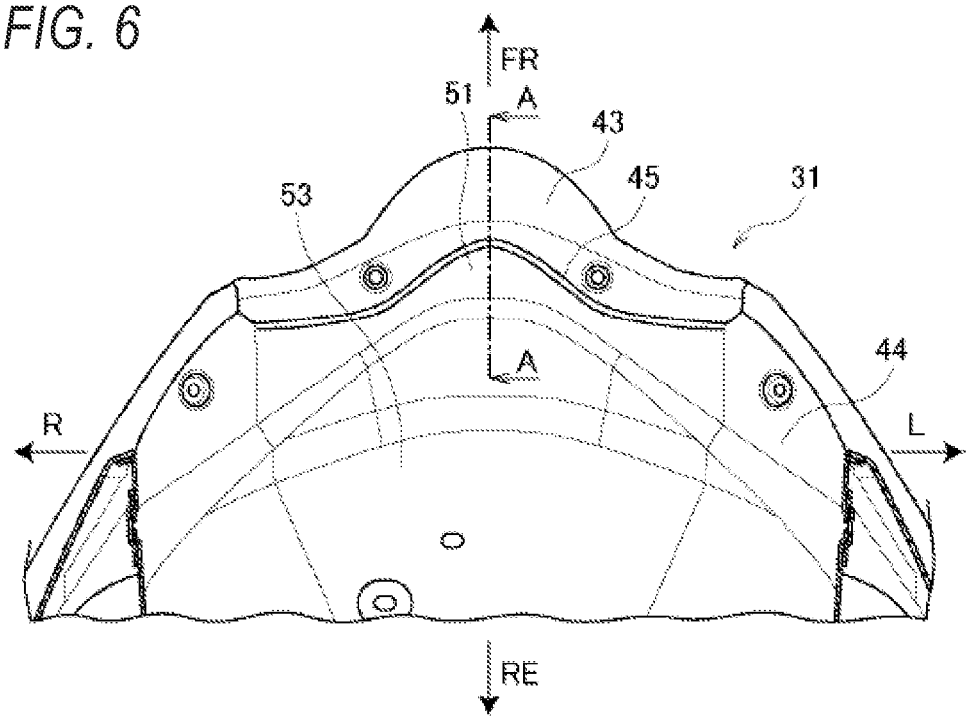
FIG. 6 is a bottom view of the vehicle front portion according to the present embodiment.
Figure 7:
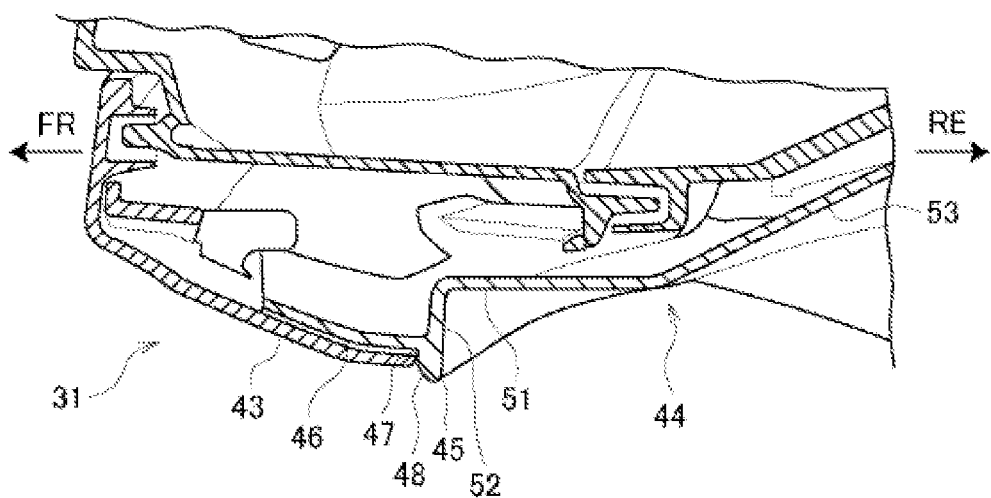
FIG. 7 is a cross-sectional view taken along a line A-A in FIG. 6.
Figure 8:
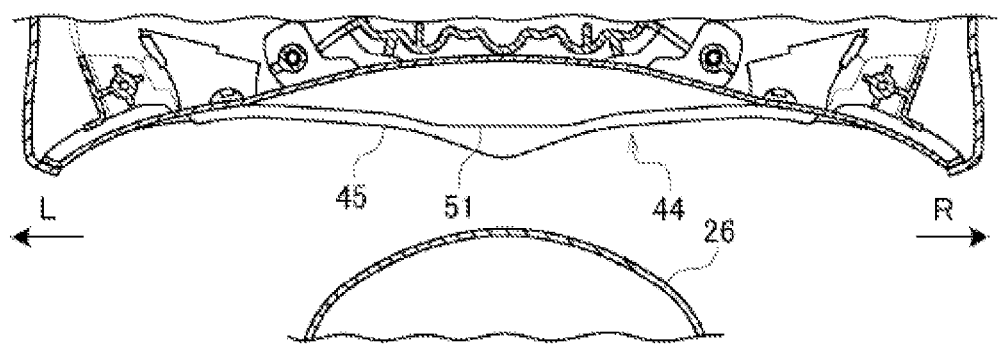
FIG. 8 is a rear view of a protruding portion according to the present embodiment.

Hereinafter, the front cowl of the straddle-type vehicle will be described with reference to FIGS. 3 to 8. FIG. 3 is a front view of the vehicle front portion according to the present embodiment. FIG. 4 is a side view of the vehicle front portion according to the present embodiment. FIG. 5 is a perspective view of the vehicle front portion according to the present embodiment. FIG. 6 is a bottom view of the vehicle front portion according to the present embodiment. FIG. 7 is a cross-sectional view taken along a line A-A in FIG. 6. FIG. 8 is a rear view of a protruding portion according to the present embodiment.

As illustrated in FIGS. 3 to 5, the windbreak screen 33 is provided at the upper portion of the front cowl 31, and the pair of side cowls 32 covering lateral sides of the front forks 23 are provided on a left edge and a right edge of the front cowl 31. The front cowl 31 is formed so as to cover a base end side of the screen 33 and a periphery of the central headlamp 34. The turn signal lamps 35 and openings 36 are formed between the front cowl 31 and the pair of side cowls 32. A streamlined shape is formed by drawing an upslope curve from a front end of the headlamp 34 toward a rear end of the screen 33 and drawing a curve widening a vehicle width from the front end of the headlamp 34 toward rear ends of the side cowls 32.

The front cowl 31 is formed by a plurality of cowl members. The front surface of the front cowl 31 is formed by a front center cowl 41 covering an upper side of the headlamp 34, a pair of front side cowls 42 covering both left and right sides of the headlamp 34, and a front under cowl 43 covering a lower side of the headlamp 34. The lower surface of the front cowl 31 is formed by a part of the front under cowl 43 and a front bottom cowl 44 covering a lower side of the headlamp 34. For attaching exterior members such as various cowls and lamps to each other, any attachment method of screwing, hooking, and clipping may be used.

As illustrated in FIGS. 6 and 7, the front bottom cowl 44 is connected to a lower surface of the front under cowl 43 and is formed so as to cover an entire lower region of the lamps. A protruding portion 45 protruding downward from a lower surface of the front bottom cowl 44 is formed at a boundary between the front under cowl 43 and the front bottom cowl 44. The protruding portion 45, in the bottom view; extends in a substantially V shape spreading outwardly in the vehicle width direction from a central position in a vehicle width direction toward the vehicle rear side. The protruding portion 45 protrudes downward from the lower surface of the front under cowl 43, and blocks the flow of the traveling wind from the lower surface of the front under cowl 43 toward the lower surface of the front bottom cowl 44.

An overlapping portion 46 on a front side of the front bottom cowl 44 enters an inside of the front under cowl 43, and a tip end of the protruding portion 45 connected to a rear side of the overlapping portion 46 protrudes from the front under cowl 43. A front surface of the protruding portion 45 includes a vertical surface 47 facing a rear end surface of the front under cowl 43 and a tapered surface 48 protruding downward from the front under cowl 43. A height of the vertical surface 47 is formed to be substantially the same as a thickness of the front under cowl 43, and the tapered surface 48 of the protruding portion 45 protrudes so as to be connected to the lower surface of the front under cowl 43. The tapered surface 48 is inclined as a downward slope toward the vehicle rear side with distance from the lower surface of the front under cowl 43.

Since the protruding portion 45 extends in the V shape in the bottom view; the air resistance is reduced by diverting the traveling wind from the vehicle front side obliquely rearward. Further, since the tapered surface 48 of the protruding portion 45 is connected to the lower surface of the front under cowl 43, the air resistance is reduced by diverting the traveling wind from the vehicle front side obliquely downward. In this way, the protruding portion 45 suppresses the increase in the air resistance and diverts the flow of the traveling wind. Further, since the protruding portion 45 is separated from a tip end of the front cowl 31 toward the vehicle rear side and the tip end of the protruding portion 45 is inclined, the protruding portion 45 becomes less noticeable in the front view: Further, the tip end of the protruding portion 45 has a round shape, and safety when the tip end of the protruding portion 45 is touched is enhanced.

The front cowl 31 is formed with a stepped portion 51 adjacent to a downstream side of the protruding portion 45 and defined by a recess on the lower surface of the front bottom cowl 44 recessed upward. The stepped portion 51 forms a bent surface having a substantially L-shaped cross section, and blocks the flow of the traveling wind from the lower surface of the front under cowl 43 along the lower surface of the front bottom cowl 44 by a rapid change in the shape of the lower surface. A curved portion 53 inclined as an upward slope toward the vehicle rear side is connected to a rear end of the stepped portion 51. As described above, in the front cowl 31 of the present embodiment, a discontinuous portion having a non-streamlined shape with respect to the flow of the traveling wind is formed by the protruding portion 45 and the stepped portion 51 so as to break the streamlined shape from the front under cowl 43 toward the curved portion 53.

The flow of the traveling air is separated from the lower surface of the front cowl 31 by the protruding portion 45 and the stepped portion 51, and the traveling wind is less likely to flow along a lower surface of the curved portion 53 downstream of the stepped portion 51. Therefore, the traveling wind does not flow to the upper side inside the vehicle, and the traveling wind easily flows straight from the vehicle front side toward the vehicle rear side. Since it is hard for the traveling wind to enter a portion on the upper side inside the vehicle where the wind is hardly discharged, the air resistance received from the traveling wind decreases. Further, the traveling wind is blown to the engine 16 on a lower side inside the vehicle, and the heat dissipation performance is improved. The flow of the traveling wind passing below the front cowl 31 will be described in detail later.

As illustrated in FIG. 8, the central position and lower edges of both left and right ends of the protruding portion 45 in the vehicle width direction are formed in an "m" shape in the rear view by protruding downward largely. Positions of the lower edges of the protruding portion 45 are lower than a position of a front fork bracket 55 (FIG. 9), and the traveling wind passing below the protruding portion 45 is less likely to hit the front fork bracket 55. A height difference from the lower edges of the protruding portion 45 to a bottom surface of the stepped portion 51 is formed to be the largest at the central position in the vehicle width direction, and the flow of the traveling wind is easily separated from the lower surface of the front bottom cowl 44 at the central position in the vehicle width direction where a flow velocity of the traveling wind is high.

The reason why the flow velocity of the traveling wind is high at the central position in the vehicle width direction on the lower surface of the front bottom cowl 44 is that the front end of the front cowl 31 extends toward a vehicle body front side, and the vehicle body front side has less shielding object than a vehicle body rear side. Further, at the central position in the vehicle width direction, the front fender 26 is present below the front bottom cowl 44, and a distance between the front bottom cowl 44 and the front fender 26 is the shortest, so that a flow path of the traveling wind is narrowed. Therefore, the flow velocity at the central position in the vehicle width direction of the front bottom cowl 44 is increased by the Venturi effect.

Further, heights of the protruding portion 45 and the stepped portion 51 may be any height non-streamlined shape with respect to the flow of the traveling wind. In this case, since the front bottom cowl 44 is made of resin, it is preferable that the protruding portion 45 and the stepped portion 51 have such heights that sink marks do not occur at the time of resin molding. A vertical surface 52 (see FIG. 7) connecting the protruding portion 45 to the stepped portion 51 is substantially perpendicular to the bottom surface of the stepped portion 51, but may be inclined at 45 degrees or more. Further, the streamlined shape in the present embodiment indicates a shape by which the flow of the traveling wind does not separate from a surface of an object, and the non-streamlined shape in the present embodiment indicates a shape by which the flow of the traveling wind separates from the surface of the object.

Figure 9:
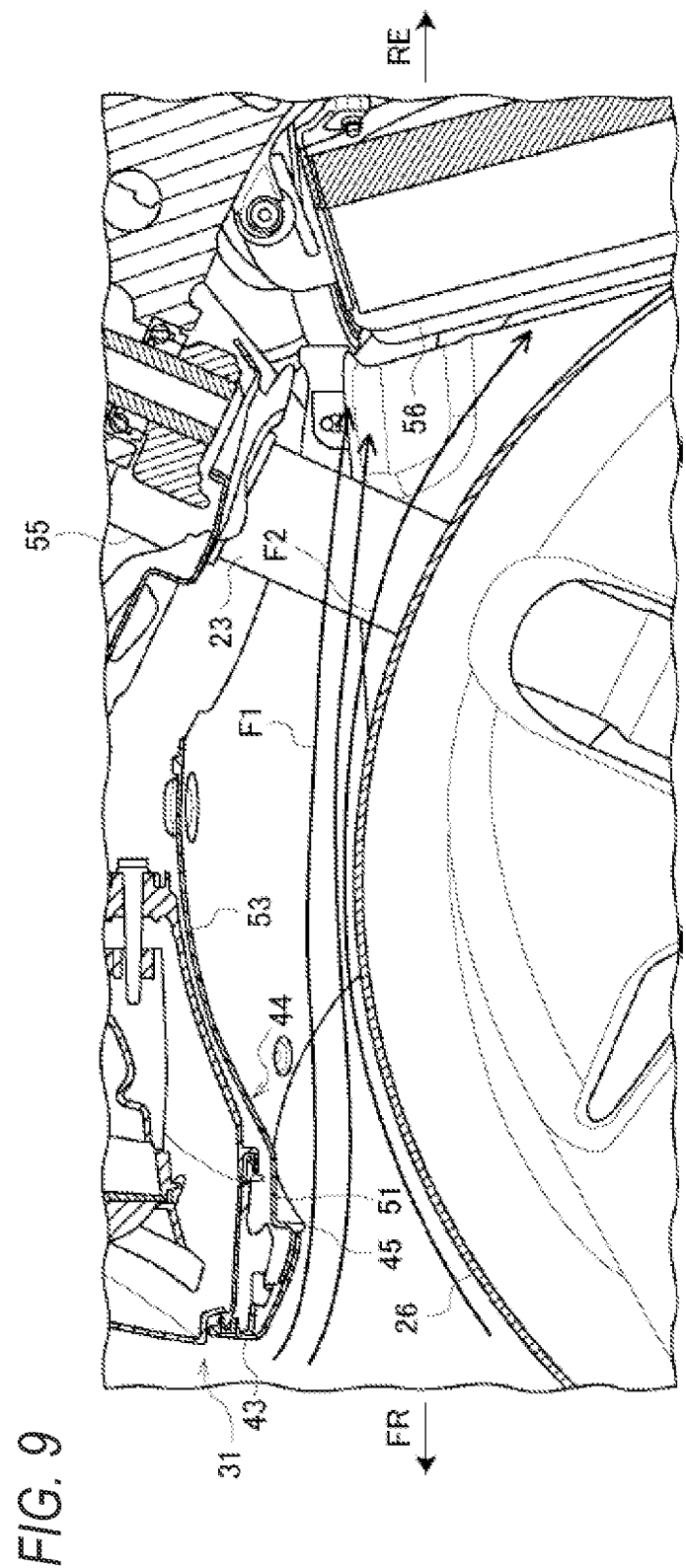
FIG. 9 is a view illustrating a flow of traveling wind below a front cowl according to the present embodiment.

The flow of the traveling wind below the front cowl will be described with reference to FIG. 9. FIG. 9 is a view of the flow of the traveling wind below the front cowl according to the present embodiment.

As illustrated in FIG. 9, the front fender 26 is provided below the front bottom cowl 44. An upper surface of the front fender 26 is curved in an arch shape along the front wheel 25 (see FIG. 1), and the curved portion 53 of the front bottom cowl 44 is curved in an arch shape similar to the upper surface of the front fender 26. The front fork bracket 55 is positioned on an extension line of a rear end of the curved portion 53, and a radiator 56 of the engine 16 is positioned below the front fork bracket 55 and behind the front fender 26. Further, a cylinder (not illustrated) is positioned behind the radiator 56.

The traveling wind enters from between the front bottom cowl 44 and the front fender 26 during the traveling of the vehicle. A flow F1 of the traveling wind on a lower surface side of the front bottom cowl 44 is separated from the lower surface of the front bottom cowl 44 by the protruding portion 45 and the stepped portion 51 which are non-streamlined with respect to the flow F1. Most of the flow F1 of the traveling wind flows straight from the vehicle front side toward the vehicle rear side, but does not flow along the lower surface of the front bottom cowl 44. At this time, since the positions of the lower edges of the protruding portion 45 are lower than the position of the front fork bracket 55, the flow F1 of the traveling wind separated from the lower edges of the protruding portion 45 is less likely to hit the front fork bracket 55, and the increase in the air resistance is suppressed.

Further, since the amount of the traveling wind flowing toward the upper side inside the vehicle along the curved portion 53 is reduced, the traveling air is less likely to flow into the gaps between various components such as the fuel tank 17 (see FIG. 1) and the air cleaner on the upper side inside of the vehicle where it is hard to discharge wind, and the increase in the air resistance is suppressed. Since the traveling wind does not pass through the gaps between these components, the traveling wind is not blown to the driver, and the comfort during the traveling of the vehicle is maintained. Further, since a position of the radiator 56 is lower than the positions of the lower edges of the protruding portion 45, the flow F1 of the traveling wind separated from the lower edges of the protruding portion 45 easily hits the radiator 56 and the cylinder behind the radiator 56.

A flow F2 of the traveling wind on an upper surface side of the front fender 26 advances along the upper surface of the front fender 26 and is blown toward the radiator 56 and the cylinder. In this way, the amount of cooling wind is increased by an amount that the flow F1 of the traveling wind on a lower surface side of the front cowl 31 easily hits the radiator 56 and the cylinder, and a heat dissipation performance of the radiator 56 and the cylinder is improved. Although the air resistance is increased by the protruding portion 45 provided at the front bottom cowl 44, since the protruding portion 45 extends in a substantially V shape in the bottom view and a front surface of the protruding portion 45 is formed as the tapered surface 48 (see FIG. 7), the flow of the traveling wind is diverted, and the increase in the air resistance is sufficiently suppressed.

As described above, according to the present embodiment, the flow of the traveling wind on the lower surface side of the front bottom cowl 44 is separated by the protruding portion 45 and the stepped portion 51. Since the traveling wind is not guided by the lower surface of the front cowl 31, the air resistance received from the traveling wind is reduced even if there is a portion on the extension line of the lower surface of the front cowl 31 where it is hard to discharge wind. Since the traveling wind easily flows below the lower surface of the front bottom cowl 44 from the vehicle front side toward the vehicle rear side, the traveling wind is effectively blown toward the radiator 56 and the cylinder, and the heat dissipation performance is improved.

Figure 10A:
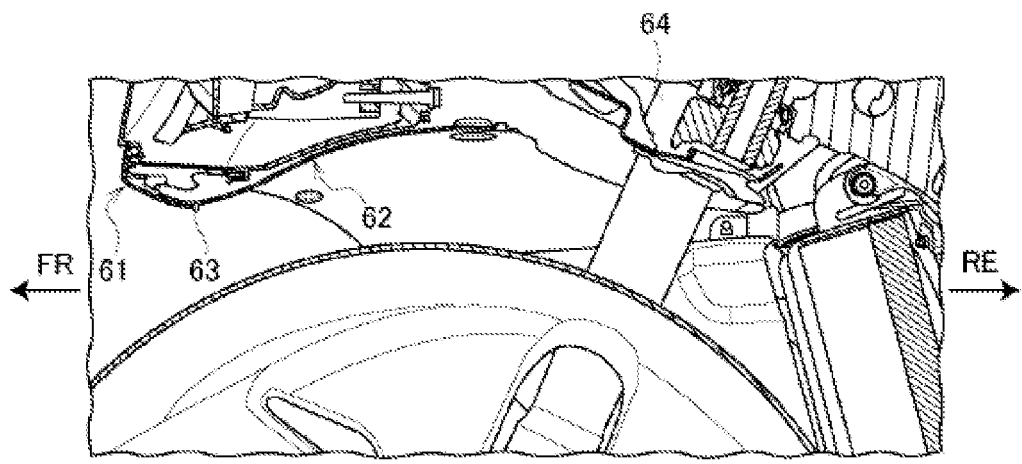
FIGS. 10A and 10B illustrate cross-sectional views of front cowls according to modifications.

In the present embodiment, the discontinuous portion is formed by the protruding portion and the stepped portion, but the discontinuous portion may be formed by either the protruding portion or the stepped portion. For example, as illustrated in a modification of FIG. 10A, the discontinuous portion may be formed by a protruding portion 63 protruding downward from a lower surface of a front cowl 61 (front bottom cowl 62). In this case, it is preferable that a position of a lower edge of the protruding portion 63 is lower than a position of the front fork bracket 64, and a height difference between a base end and a tip end of the protruding portion 63 is formed to be the largest at the central position in the vehicle width direction.

Figure 10B:
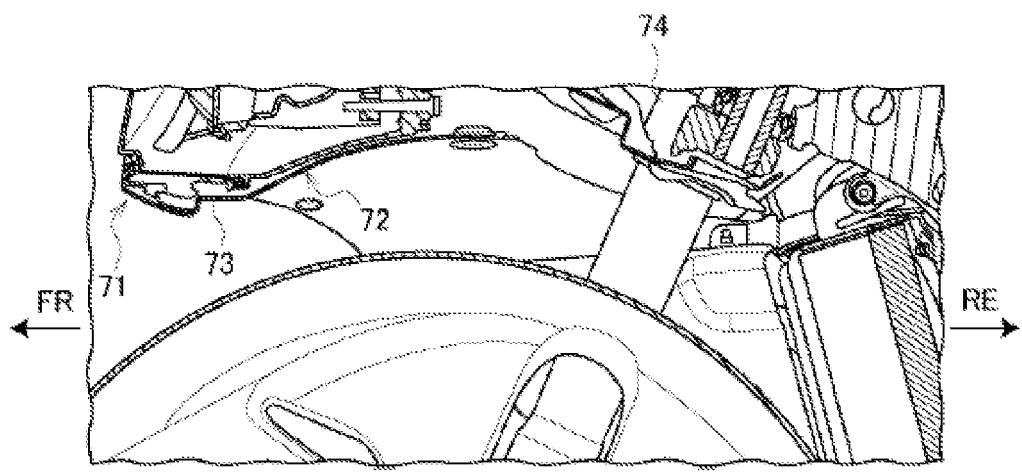

Further, as illustrated in a modification of FIG. 10B, the discontinuous portion may be formed by a stepped portion 73 defined by a recess on a lower surface of a front cowl 71 (front bottom cowl 72) recessed upward. In this case, it is preferable that a position of a lower edge of the stepped portion 73 is lower than a position of the front fork bracket 74, and a height difference between a bottom surface and a lower edge of the protruding portion 73 is formed to be the largest at the central position in the vehicle width direction.

Further, in the present embodiment, the configuration in which the protruding portion and the stepped portion are provided, as the discontinuous portion, on the lower surface of the front cowl is exemplified, but the present invention is not particularly limited thereto as long as the discontinuous portion has a shape breaking the streamlined shape of the lower surface of the front cowl. For example, the discontinuous portion may be formed by a curved surface non-streamlined with respect to the flow of the traveling wind.

Further, in the present embodiment, the configuration in which the radiator is provided as a heat exchanger in the engine is exemplified, but an oil cooler may be provided as the heat exchanger in the engine, or both the radiator and the oil cooler may be provided as the heat exchanger. Further, instead of the engine with the heat exchanger, an air-cooled engine without the heat exchanger may be mounted on the straddle-type vehicle. Even in such a configuration, the traveling wind is effectively blown toward the cylinder, and the heat dissipation performance is improved.

Further, in the present embodiment, the protruding portion extends in the vehicle width direction, but the protruding portion may be formed at least at the central position in the vehicle width direction. Similarly, in the present embodiment, the stepped portion extends in the vehicle width direction, but the stepped portion may be formed at least at the central position in the vehicle width direction.

Further, in the present embodiment, the lower surface of the front cowl is formed by the lower surface of the front under cowl and the lower surface of the front bottom cowl, but the lower surface of the front under cowl and the lower surface of the front bottom cowl may be integrally formed.

Further, the front cowl of the straddle-type vehicle in the present embodiment is not limited to a touring-type motorcycle, and may be applied to a motorcycle of another type. The straddle-type vehicle is not limited to a general vehicle on which a rider rides in a posture of straddling a seat. Alternatively, the straddle-type vehicle further includes a scooter-type vehicle on which a rider rides without straddling a seat.

As described above, a front cowl (31) according to the present embodiment is a front cowl for covering a vehicle front portion of a straddle-type vehicle, and includes a discontinuous portion (a protruding portion 45 or 63, and a stepped portion 51 or 73) which has a non-streamlined shape with respect to a flow of traveling wind is formed on a lower surface of the front cowl (a front bottom cowl 44). According to this configuration, the flow of the traveling wind along the lower surface of the front cowl is separated by the non-streamlined discontinuous portion. Since the traveling wind is not guided by the lower surface of the front cowl, air resistance received from the traveling wind is reduced even if there is a portion on an extension line of the lower surface of the front cowl where it is hard to discharge wind. Since the traveling wind easily flows below the lower surface of the front cowl from a vehicle front side toward a vehicle rear side, the traveling wind is effectively blown toward the engine, and a heat dissipation performance is improved.

In the front cowl of the present embodiment, a front fork bracket (55, 64, or 74) is provided at a vehicle front portion of the straddle-type vehicle, and a position of a lower edge of the discontinuous portion is lower than a position of the front fork bracket. According to this configuration, the traveling wind passing below the discontinuous portion is less likely to hit the front fork bracket, and the air resistance is reduced.

In the front cowl of the present embodiment, the discontinuous portion extends in a vehicle width direction, and a height difference of the discontinuous portion becomes the largest at a central position in the vehicle width direction. According to this configuration, the flow of the traveling wind is easily separated from the lower surface of the front cowl at the central position in the vehicle width direction where an influence of the traveling wind is large.

In the front cowl of the present embodiment, the discontinuous portion is a protruding portion (63) protruding downward from the lower surface of the front cowl. According to this configuration, the flow of the traveling wind is separated from the lower surface of the front cowl by the non-streamlined protruding portion, and the amount of the traveling wind toward a heat exchanger or the engine can be increased.

In the front cowl of the present embodiment, the discontinuous portion includes the protruding portion (45) protruding downward from the lower surface of the front cowl and the stepped portion (51) defined by a recess on the lower surface of the front cowl recessed upward. The stepped portion (51) is adjacent to a downstream side of the protruding portion. According to this configuration, the flow of the traveling wind is more easily separated from the lower surface of the front cowl by the non-streamlined protruding portion and the stepped portion, and the amount of the traveling wind toward the engine can be increased.

In the front cowl of the present embodiment, the protruding portion (45 or 63) spreads outwardly in the vehicle width direction toward a vehicle rear side from the central position in the vehicle width direction. According to this configuration, it is possible to reduce the air resistance received from the traveling wind by diverting the traveling wind from the vehicle front side obliquely rearward by the protruding portion.

In the front cowl of the present embodiment, a front surface of the protruding portion includes a tapered surface (48) inclined toward the vehicle rear side with distance from the lower surface of the front cowl. According to this configuration, it is possible to reduce the air resistance received from the traveling wind by diverting the traveling wind from the vehicle front side obliquely downward by the protruding portion. Further, the protruding portion can become less noticeable.

In the front cowl of the present embodiment, the discontinuous portion is a stepped portion (73) defined by a recess on the lower surface of the front cowl recessed upward. The flow of the traveling wind is separated from the lower surface of the front cowl by the non-streamlined stepped portion, and the amount of the traveling wind toward the engine can be increased.

Although the present embodiment has been described, the above-described embodiment and the modification may be combined entirely or partially as another embodiment.

The technique of the present invention is not limited to the above-described embodiment, and various changes, substitutions, and modifications may be made without departing from the spirit of the technical idea of the present invention. Further, the present invention may be implemented using other methods as long as the technical idea can be implemented by the methods through advance of the technology or other derived technologies. Accordingly, the claims cover all embodiments that may be included within the scope of the technical idea.

What is claimed is:

1. A front cowl for covering a vehicle front portion of a straddle-type vehicle, the front cowl comprising:
    a discontinuous portion which has a non-streamlined shape with respect to a flow of traveling wind and is formed on a lower surface of the front cowl,
    the discontinuous portion extends in a vehicle width direction, and
    a height difference of the discontinuous portion becomes the largest at a central position in the vehicle width direction,
    the discontinuous portion has a shape that a center thereof in the vehicle width direction is the lowest in the discontinuous portion so as to close a front fender which is disposed at the central position in the vehicle width direction and below the lower surface of the front cowl.

2. The front cowl according to claim 1, wherein a position of a lower edge of the discontinuous portion is lower than a position of a front fork bracket provided at a vehicle front portion of the straddle-type vehicle.

3. The front cowl according to claim 1, wherein the discontinuous portion is a protruding portion protruding downward from the lower surface of the front cowl.

4. The front cowl according to claim 1, wherein the discontinuous portion includes a protruding portion protruding downward from the lower surface of the front cowl and a stepped portion defined by a recess on the lower surface of the front cowl recessed upward, and the stepped portion is adjacent to a downstream side of the protruding portion.

5. The front cowl according to claim 3, wherein the protruding portion spreads outwardly in a vehicle width direction from a central position in the vehicle width direction toward a vehicle rear side.

6. The front cowl according to claim 4, wherein the protruding portion spreads outwardly in a vehicle width direction from a central position in the vehicle width direction toward a vehicle rear side.

7. The front cowl according to claim 3, wherein a front surface of the protruding portion includes a tapered surface inclined toward a vehicle rear side with distance from the lower surface of the front cowl.

8. The front cowl according to claim 4, wherein a front surface of the protruding portion includes a tapered surface inclined toward a vehicle rear side with distance from the lower surface of the front cowl.

9. The front cowl according to claim 1, wherein the discontinuous portion is a stepped portion defined by a recess on the lower surface of the front cowl recessed upward.

10. The front cowl according to claim 1, wherein the center of the discontinuous portion in the vehicle width direction is lower than other part of the discontinuous portion including both ends thereof in the vehicle width direction.

11. A front cowl for covering a vehicle front portion of a straddle-type vehicle, the front cowl comprising:
    a discontinuous portion which has a non-streamlined shape with respect to a flow of traveling wind and is formed on a lower surface of the front cowl, wherein the discontinuous portion is a protruding portion protruding downward from the lower surface of the front cowl, and
    the protruding portion spreads outwardly in a vehicle width direction from a central position in the vehicle width direction toward a vehicle rear side.

12. A front cowl for covering a vehicle front portion of a straddle-type vehicle, the front cowl comprising:
    a discontinuous portion which has a non-streamlined shape with respect to a flow of traveling wind and is formed on a lower surface of the front cowl, wherein the discontinuous portion includes a protruding portion protruding downward from the lower surface of the front cowl and a stepped portion defined by a recess on the lower surface of the front cowl recessed upward, and the stepped portion is adjacent to a downstream side of the protruding portion, and
    the protruding portion spreads outwardly in a vehicle width direction from a central position in the vehicle width direction toward a vehicle rear side.

* * * * *